United States Patent [19]

McCarthy et al.

[11] Patent Number: 5,685,062

[45] Date of Patent: Nov. 11, 1997

[54] SELF-ASSEMBLY FABRICATION METHOD FOR PLANAR MICRO-MOTOR

[75] Inventors: Shaun Leaf McCarthy, Ann Arbor; Sickafus Nathan Edward, Grosse Ile, both of Mich.

[73] Assignee: Ford Motor Company, Dearborn, Mich.

[21] Appl. No.: 270,271

[22] Filed: Jul. 5, 1994

[51] Int. Cl.$^6$ ................................................. H02K 15/04
[52] U.S. Cl. ........................... 29/578; 29/424; 29/596; 310/40 MM; 310/45; 427/132
[58] Field of Search ........................... 29/596, 598, 424; 310/40 MM, 45, 42; 427/128–132

[56] References Cited

U.S. PATENT DOCUMENTS

| | | |
|---|---|---|
| 5,093,594 | 3/1992 | Mehregany . |
| 5,189,323 | 2/1993 | Carr et al. . |
| 5,191,251 | 3/1993 | Paratte . |
| 5,206,983 | 5/1993 | Guckel et al. ............................. 29/598 |
| 5,252,881 | 10/1993 | Muller et al. ...................... 310/40 MM |

FOREIGN PATENT DOCUMENTS

| | | |
|---|---|---|
| 0520631A2 | 6/1992 | European Pat. Off. . |
| 90/07223 | 6/1990 | WIPO . |

OTHER PUBLICATIONS

Microfabrication Of High–Density Arrays Of Microelectromagnetics With On–Chip Electronics, F. Cardot, Et Al CH–2007 Neuchatel, SW.

A Fully Integrated Micromachined Toroidal Inductor With A Nickel–Iron Magnetic Core, Chong H. Ahn, et al, Sch. Of Elec. Eng. Microelectronics Research Center, Georgia Inst. Of Technology.

Polyimide–Based Processes For The Fabrication Of Thick Electroplated Microstructures, Mark G. Allen, Sch. Of Elec. Eng. Microelectronics Research Center, Georgia Institute Of Tech. pp. 60–65.

*Primary Examiner*—Carl E. Hall
*Attorney, Agent, or Firm*—Allan J. Lippa; Roger L. May

[57] ABSTRACT

A method of fabricating a planar micro-motor particularly well-suited to batch methods of microfabricating multiple planar stepper micro-motors from a single substrate wafer. Such micro-motors, having a planar stator supported by an electrically insulating substrate, a planar rotor body aligned over the stator, and a housing integral with the substrate and forming a rotor chamber therewith in which the rotor is rotatably captured, are formed by microfabricating the stator, rotor, and housing on the substrate with a boundary of release material encapsulating the rotor body. The release material is then removed to free the rotor body for rotation within the rotor chamber. Release materials, such as poly-alpha-methylstyrene, are suitable, being removable to free the rotor by heating to at least 180° C. under vacuum. In the course of the sequential processing steps during the microfabrication, multiple layers of photo-responsive patterning material are used, some of which layers are removed in their entirety, while portions of at least some of the layers of photo-responsive patterning material remain in the micro-motor to at least partially form the housing or as part of the rotor body.

14 Claims, 16 Drawing Sheets

SELF-ASSEMBLY FABRICATION METHOD FOR PLANAR MICRO-MOTOR

INTRODUCTION

The present invention is directed to fabrication of micro-motors having a planar stator and a parallel, aligned, planar rotor, which operate via force generating magnetic fields applied across the planar gap separating the stator and rotor. The micro-motors are self-assembled in the course of fabrication.

BACKGROUND OF THE INVENTION

Microfabrication techniques are known for production of microelectronic circuits. More recently, such microfabrication techniques have been applied in the production of three-dimensional mechanical microdevices, for example, in the fields of micro-optics, mechanical and medical engineering, and the like. Using such techniques, microstructures can be fabricated comprising a variety of materials to meet conductivity and other functional requirements. Opportunities in automotive applications have been identified for miniature motors offering improved packaging and cost reduction opportunities.

Technologies for microfabrication are referred to as MEMS for microelectromechanical systems. MEMS technologies include those that employ the thin-film deposition and patterning procedures of the silicon electronics industry. Miniature motors and electrically driven actuators have been fabricated using MEMS, and cost efficiencies can be achieved through batch processing of silicon or other wafers.

A microfabrication technology known as LIGA (a German acronym taken from words referring to lithography, electroplating, and injection molding) applies MEMS to designs based on plastics, metals, alloys, and ceramics. LIGA also can be used for batch processing.

Other MEMS technologies applicable to the present invention include those referred to as MPP-MEMS ("micropatterned polymers for MEMS"). Instead of using PMMA resist and synchrotron exposures as in LIGA, the MPP-MEMS approach uses a photosensitive polyimide as the resist and exposes it to ultra violet light. Electroforming is then used to form devices and features in the patterned polyimide. The minimum feature size typically is larger than in LIGA and the aspect ratio is not as high.

The importance of microfabrication is increasing along with general miniaturization trends and a growing need to integrate mechanical, electronic, and optical components into microsystems. The present invention provides a method of fabricating planar micro-motors in self-assembled form, using known microfabrication techniques such as those mentioned above, together with certain new techniques described below.

SUMMARY OF THE INVENTION

In accordance with the present invention, a method is provided for fabricating a planar micro-motor comprising a stator supported by a substrate and comprising electromotive force means arrayed in a first plane for receiving electrical current to selectively generate electromagnetic fields. The electromotive force means preferably comprises a plurality of micro-coils, most preferably bifilar micro-coils, circumferentially spaced in a plane about a center point. A rotor comprises a planar rotor body aligned over the electromotive force means in a second, parallel plane. The rotor body is captured in a rotor chamber formed cooperatively by the stator and a housing which is integral with the substrate. The rotor body is rotatable in the rotor chamber in response to the electromagnetic fields generated by the micro-coils of the stator across the planar gap sandwiched between the stator and the rotor body. The rotor body generally further comprises a rotor shaft extending from the rotor body away from the stator and having a longitudinal axis of rotation intersecting the plane of the micro-coil through the aforesaid center point. The rotor body has a plurality of magnetic poles or regions, embedded in the rotor body at circumferentially-spaced locations, each typically comprising a body of magnetic material. Energizing means are provided for selectively passing multi-phase electrical current from a suitable power source to selected subsets of the micro-coils. Such energizing means typically comprise electrically conductive leads to the micro-coils from power buses.

In one aspect of the invention, the method of fabricating such self-assembled micro-motors comprises the steps of microfabricating the stator, rotor, and housing on the substrate with a boundary of release material encapsulating the rotor body within the rotor chamber. By then removing the release material, the rotor body is freed for rotation within the rotor chamber. Thus, in accordance with one highly-significant advantage of this aspect of the invention, the planar micro-motor is fabricated with the essential components described above, without the need for separately producing such components followed by mechanical assembly thereof.

In accordance with another aspect, multiple layers of photo-responsive patterning material are used in the fabrication method of the invention. Some of the layers of patterning material are removed in their entirety. Portions of at least some of the layers, however, remain in the micro-motor to at least partially form the housing and/or part of the rotor body. Application of this technique, as further described below, provides significant processing advantages, including reduction of fabrication complexity, excellent process and dimensional control and the like.

The aforesaid energizing means of the planar micro-motor optionally may comprise circuitry means to control the duration and sequence of micro-coil actuation to control, in turn, the direction and degree of rotation of the rotor. In this regard, the fabrication method of the invention is particularly well-suited to production of stepper-type micro-motors, as further described below. An indicator means—for example, a visible flag or mark carried on a rotor shaft—may be used to indicate a gauge reading, system condition, or the like. Additional features and advantages of the invention will be further understood from the following detailed discussion of various preferred embodiments.

BRIEF DESCRIPTION OF THE DRAWINGS

Certain preferred embodiments of the invention are described and discussed in detail below in association with the appended drawings wherein.

Figure 1:
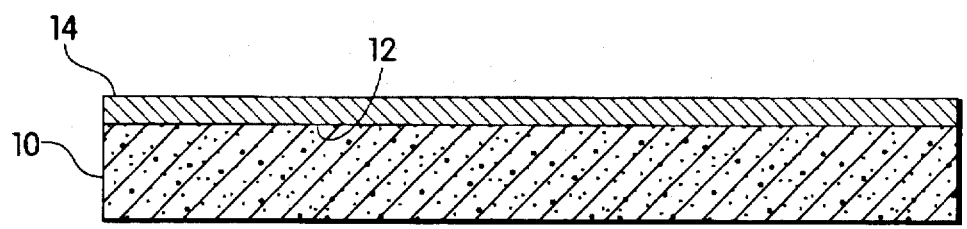
FIGS. 1–35 are schematic cross-section views of successive stages in the fabrication of a planar stepper micro-motor, in accordance with a preferred embodiment of the invention.

It should be understood that references to direction and position, both here and in the appended claims, unless otherwise indicated, refer to the orientation in which micro-motor features are illustrated in the drawings. Micro-motors fabricated in accordance with the method of this invention typically will be adaptable for use in any orientation, including use in changing orientations. In addition, the figures are not drawn to scale, and should be understood to present a simplified representation of micro-motors which can be fabricated in accordance with the method of the present invention. Such micro-motors employed in commercial embodiments may comprise hundreds and possibly even thousands of micro-coils. Also, some features have been enlarged or distorted relative to others to enable easier visualization of the components and their fabrication. In particular, extremely thin features have been thickened, and relatively long features may be shortened. Micro-motors of this type may readily be fabricated with features having dimensions on the order of 20 microns. Minimum feature sizes typically are on the order of 10 microns.

DETAILED DESCRIPTION OF CERTAIN PREFERRED EMBODIMENTS

The planar micro-motor of the invention may readily be fabricated with features having dimensions of the order of 20 microns. Minimum feature sizes in preferred embodiments, typically, are of the order of 10 microns. The preferred planar design includes a stator comprised of micro-coils arranged in a plane, with a rotor above the micro-coils. The micro-coils may have a variety of configurations, optionally being curved or polygonal in shape, with one or more windings. The rotor preferably has an array of magnetic regions positioned on or in the rotor body such that at least one is always sufficiently near a micro-coil to experience the rotational force of the electromagnetic field generated when that micro-coil is energized. The magnetic regions of the rotor body may be formed of permanent magnets, which offer advantages in tailoring the shape and intensity of the magnetic field energy density and, hence, the driving force for the planar micro-motor. This may, however, in certain embodiments, introduce the necessity of shielding external electromagnetic fields. The magnetic regions can be made of permanent magnetic materials such as CoNiReMn—P alloy. Variable reluctance micro-motors (having magnetically soft material, such as iron, rather than permanent magnets) are provided in accordance with alternative embodiments of the invention. Upon electrically energizing the micro-coils, the resulting electromagnetic field generated around the energized coils acts on the magnetic regions of the rotor body. Gradients in the resulting field pattern give rise to electromotive forces that turn the rotor as the magnetic regions of the rotor are attracted to (or repelled from) the micro-coils.

More specifically, starting and driving the planar micro-motor consists of sequentially energizing less than all of the micro-coils, such that one or more magnetic regions of the rotor are attracted toward the center of its adjacent coil. Energizing periods may consist of periodic applied voltages of various wave forms, including pulse strings patterned to achieve the desired energizing current. Such timing schemes are applicable over a broad frequency range up to a point at which the inertia of the system limits the ability of the rotor to keep up with the energizing frequency. The energizing voltage is cycled (or pulsed) with a phase and duration adapted to induce rotation in the desired direction. That is, a micro-coil which is in the correct position relative to a magnetic region of the rotor to cause an attractive force in the desired direction is energized and relaxed in sufficient time to avoid slowing the rotor rotation after the magnetic region passes the angle of maximum force for that micro-coil. Similarly, proper phasing of the energizing voltage can be used to slow and/or stop the rotor. Rotational motion of the rotor, including direction and amount of rotation, can be controlled with a high degree of precision by controlling the sequence and duration of micro-coil energization. That is, rotation can be sustained for a desired period of time, and otherwise controlled, by selecting an energization sequence and periods of energization of the individual micro-coils to produce the desired time sequence of rotational forces acting on the rotor. The sense of the sequence pattern determines the direction of rotation.

The fabrication method of the invention will now be described, including various preferred and alternative features, with reference to the appended drawings. In the discussion which follows, it should be understood that the terms "via" and its plural, "vias," are used to mean poles passing through a layer and filled (or to be filled) with metal to form a connector to provide an electrical path between or through layers. Also used is the term "photo-responsive patterning material," which is intended to mean any of the positive and negative (unless specifically limited to one of these) photoresist materials and the like, many of which are commercially available and well-known to those skilled in the use of MEMS technologies for microfabrication. This includes, for example, PMMA resist typically used in the LIGA techniques. Alternative MEMS technologies also will be suitable in accordance with this invention for fabrication of micro-motors intended for numerous applications. While the LIGA techniques can provide good dimensional accuracy, particularly in using thicker layers or, more generally, larger component dimensions, the LIGA techniques require the use of a synchrotron and often involve greater expense and complication. Photosensitive polyimide (PSP) is preferred for many applications, since it is patterned by standard photolithographic processing using commercially available materials. Numerous other suitable photoresist materials will be apparent to those skilled in this area of technology in view of the present invention. All such materials, as noted above, are referred to herein collectively as photo-responsive patterning material.

It should be recognized that although the bifilar micro-coil design discussed in detail here is generally preferred, the stator may employ micro-coils having a wide variety of configurations, particularly with respect to their electrical connection to the energizing means. Similarly, the rotor preferably has an array of radial magnetic members positioned on or in the rotor body. As in the case of the stator design, however, numerous alternative rotor designs will be apparent to those skilled in this area of technology in view of this disclosure. As a general principle, the rotor should provide in all positions relative to the stator one or more magnetic members sufficiently near a micro-coil to collectively contribute sufficient force from the electromagnetic field generated when that micro-coil is energized to cause rotation of the rotor.

Figure 2:
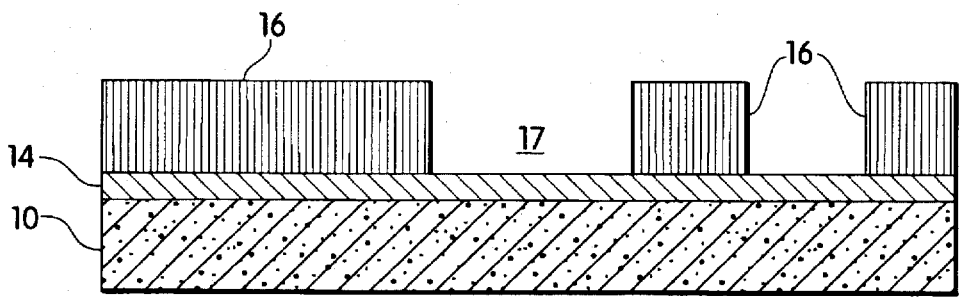

As noted above, a large number of micro-motors can be produced simultaneously in a batch process in accordance with the method of this invention, from a single wafer of insulating substrate material. Smooth-surfaced wafers of glass or polished and oxidized silicon are suitable and well-known for such fabrication processes. As shown in FIG. 1, the upper surface 12 of the substrate 10 is coated uniformly with a metal film 14 to be used in various electroplating steps later in the fabrication process. Preferably the metal film 14 consists of a sandwich of metal films, most preferably chromium or titanium immediately on the surface of the insulating substrate, followed by copper, followed by another film of chromium. These films can be applied by sputtering, or by evaporation, in accordance with known techniques, each to a thickness preferably of about 100 nm. The lower film of chromium or titanium acts as an adhesion layer between the substrate surface 12 and the copper electroplating strike. The uniform copper strike provides uniform current distribution across the surface of the substrate. The top chromium layer provides improved adhesion to the layer 16 of photo-responsive patterning material applied next, as seen in FIG. 2. Layer 16 preferably is formed of PSP material applied by spin-casting to a thickness of about 20 microns in the usual manner. Advantageously, patterned PSP provides near-vertical walls after development. After development of the photo-responsive patterning material, traces of such material in the open areas preferably are removed using, for example, an oxygen plasma. In the schematic view shown in FIG. 2, the patterning material is shown to have been patterned to provide an opening 17 in which a jumper will be formed to provide electrical connection between one terminus of a bifilar micro-coil and a power bus, both to be formed in subsequent steps, discussed below.

Figure 3:
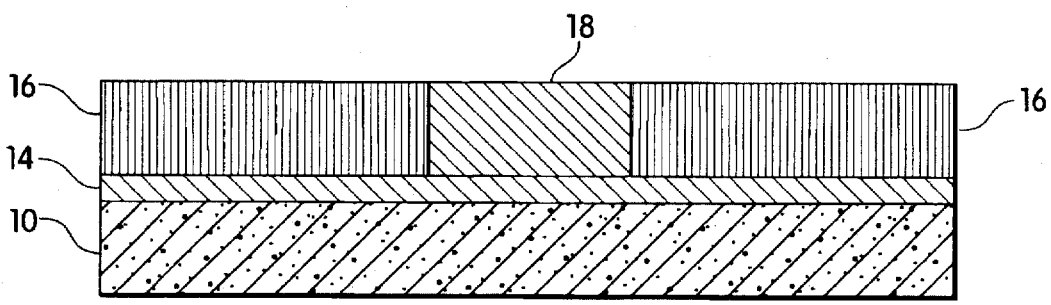
Figure 3A:
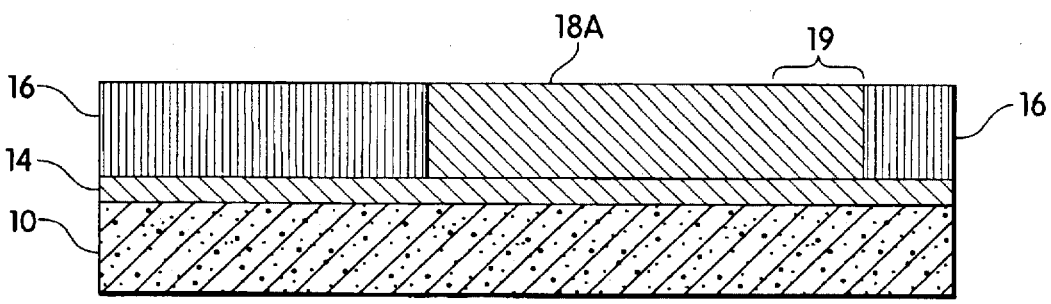

FIG. 3 shows the jumper 18 formed by electroplating copper or other metal into opening 17. FIG. 3A shows the corresponding cross-sectional view for the neighboring jumper 18A which will provide electrical connection between the second terminus of the bifilar micro-coil and a ground bus radially outward of the power bus to which the first terminus is connected. Since the ground bus is radially outward of the power bus, the jumper 18A in FIG. 3A extends further to the right than does jumper 18 in FIG. 3. The relative positions of jumpers 18 and 18A can be seen in FIG. 36 (wherein the substrate is not shown). Electrical jumper 18 is seen to extend radially outward from a first terminus 20 of bifilar micro-coil 22 to circumferentially extending power bus 24. Power bus 24 is the second of three concentric third power buses. First power bus 26 is radially inward of power bus 24 and third power bus 28 is radially outward of power bus 24. The fourth concentric bus, ground bus 30, is radially outward of the three power buses. Electrical jumper 18A is seen to extend radially outward from the second terminus 21 of bifilar micro-coil 22 to ground bus 30. Thus, as noted above, in FIG. 3A, electrical jumper 18A extends further to the right than does jumper 18 in FIG. 3.

To provide visual reference and orientation, a small portion, radially outer end 19 of electrical jumper 18A will be shown in FIGS. 4 through 35. It should be recognized, however, that jumper 18A actually is offset to a different cross-sectional depth than jumper 18.

Figure 36:
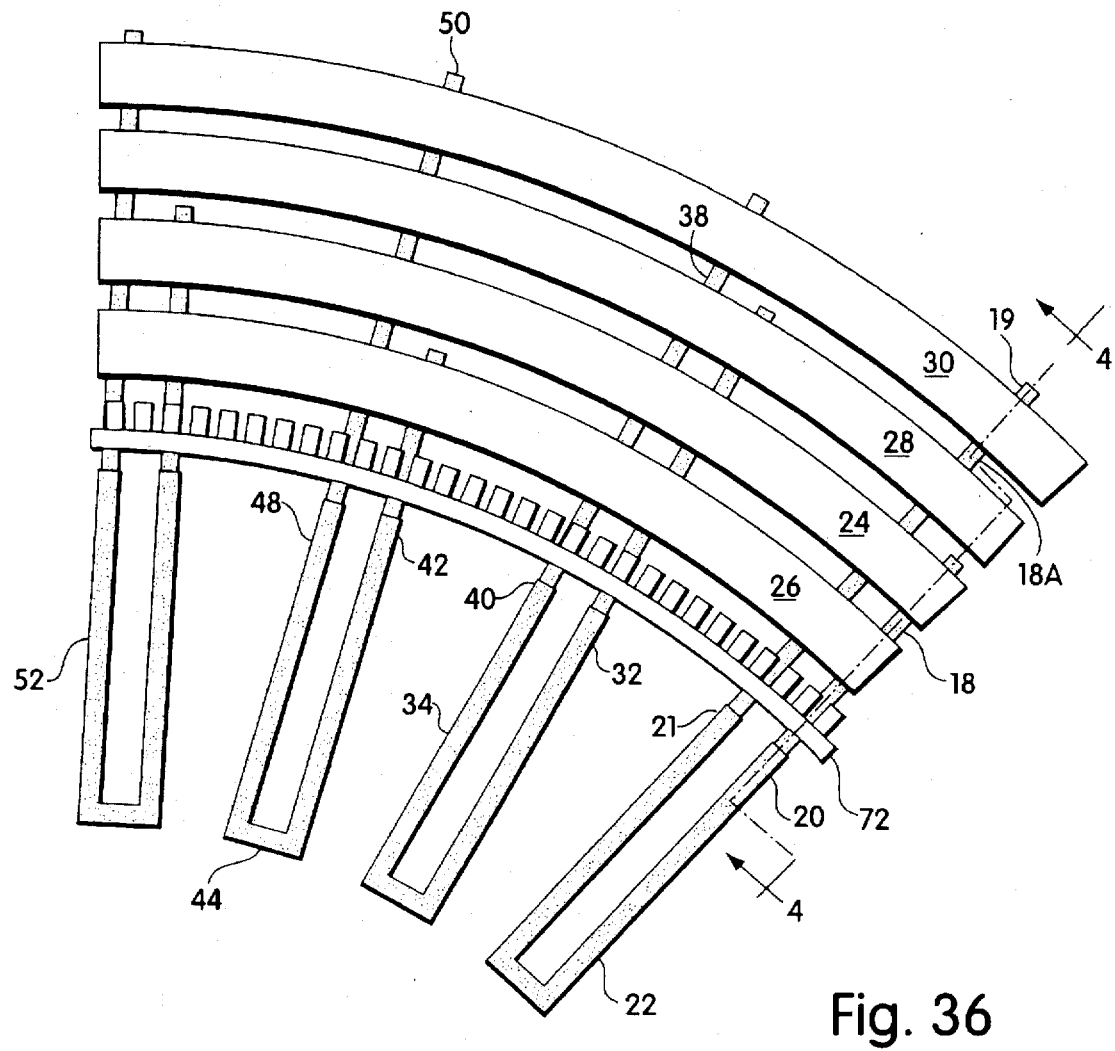
FIG. 36 is a schematic plan view of the stator components of the micro-motor of FIGS. 1–35, showing the bifilar micro-coils, each connected to a common ground bus and alternating ones of the three power buses.

Also shown in FIG. 36 is the sequencing of current phases from one bifilar micro-coil to the next. Specifically, the first terminus 32 of bifilar micro-coil 34, which is next adjacent to previously mentioned bifilar micro-coil 22, is connected to power bus 28 by electrical jumper 36. The circuit is completed for micro-coil 34 by electrical jumper 38 which extends from the second terminus 40 of micro-coil 34 to ground bus 30. The first terminus 42 of the next adjacent micro-coil 44 is connected by electrical jumper 46 to the innermost power bus 26. Its second terminus 48 is connected by electrical jumper 50 to ground bus 30. The next adjacent micro-coil 52 has the same phase as the first micro-coil 22 and is, accordingly, connected to the same power bus.

Referring again to FIGS. 3 and 3-A, the electrical jumpers 18 and 18A are formed preferably by electroplating copper into the patterned layer 16. Where a sandwich of metal films is used for electroplating strike 14, the top chromium adhesion layer should be removed in the areas exposed by development of layer 16, such as by submerging the assembly in an aqueous hydrochloric acid solution, typically 1:1 HCl to water. After rinsing in deionized water, the exposed wafer is pickled in a 10% solution of sulfuric acid to remove any copper oxide. A layer of copper, preferably about 20 microns thick, is then electroplated into layer 16 using standard acid-type copper electroplating baths and a standard DC plating power supply. While electroplated copper is preferred, those skilled in this area of technology will recognize the suitability for various applications of alternative metals, alloys, and methods of deposition.

Figure 4:
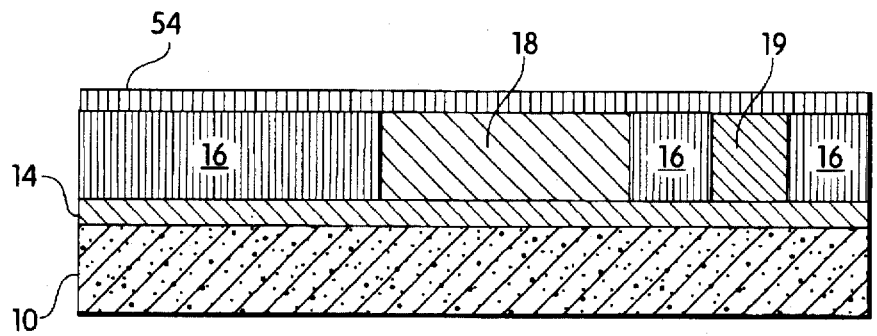
Figure 5:
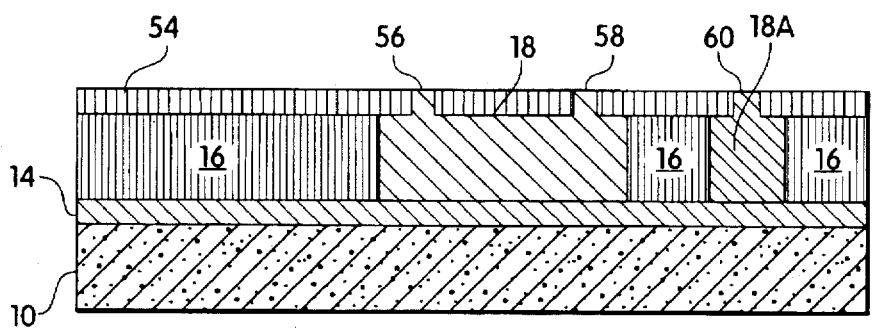

A thin layer of photo-responsive patterning material, preferably about 10 microns, is then deposited over the assembly shown in FIG. 3. This second layer is patterned for via openings to produce vias, preferably by copper electroplating, extending vertically upward to make electrical contact with the respective bifilar micro-coils and power buses, as discussed above. FIG. 4 shows this layer 54 of patterning material as first applied. In FIG. 5, the layer 54 has been patterned and the vias have been formed. Specifically, electrical jumper 18 is seen to have been provided with a radially inward via 56, which would establish electrical connection with the first terminus 20 of bifilar micro-coil 22 (see FIG. 36) and radially outer via 58, which would form an electrical connection with power bus 24. The radially outer end 19 of electrical jumper 18A is seen to have vertical via 60 for electrical contact with ground bus 30. Again, the electrical vias are preferably electroplated copper.

Figure 6:
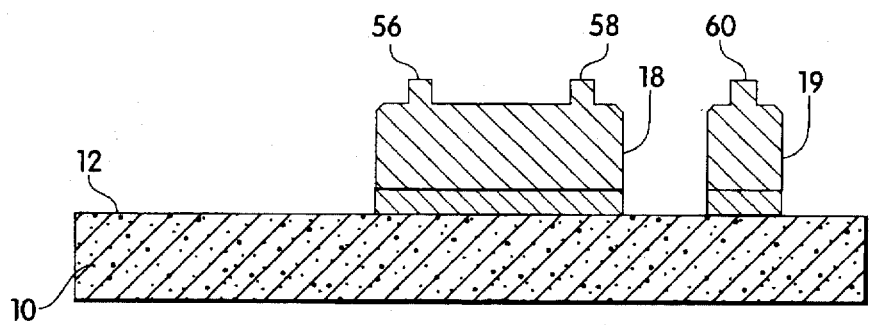
Figure 7:
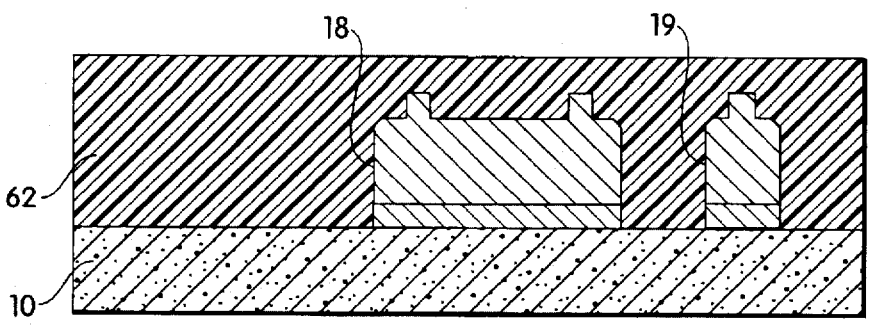

Patterning layers 16 and 54 are then stripped and the electroplating strike 14 removed, yielding the assembly shown in FIG. 6. A suitable stripper for removing the patterning layers is commercially available and well-known to those skilled in the art. The metal electroplating layer 14 is removed using appropriate etchants to electrically isolate the electrical jumpers and via structures. Where the electroplating strike layer is the Ti/Cu/Cr film stack described above, the chromium top layer can be removed first using a 50% aqueous solution of hydrochloric acid. The copper layer can then be removed in a 35 Baume ferric chloride solution or other mild copper etch solution, taking care not to significantly etch the electrical jumpers and vias. The lower titanium layer can be removed using a dilute hydrochloric acid solution.

Figure 8:
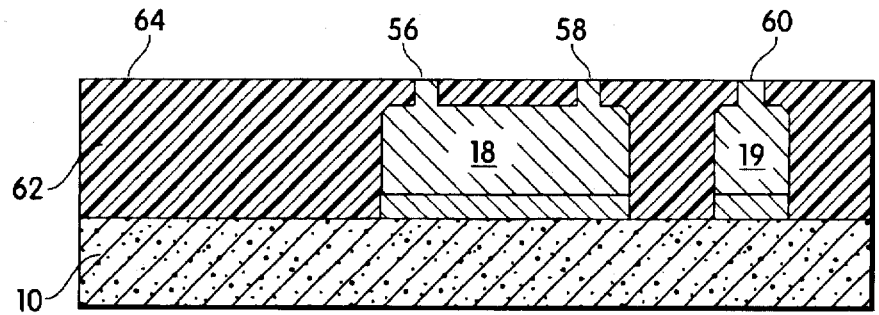
Figure 9:
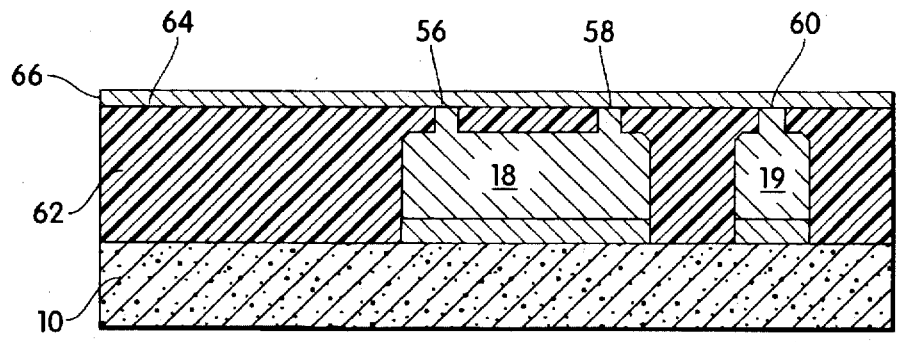
Figure 10:
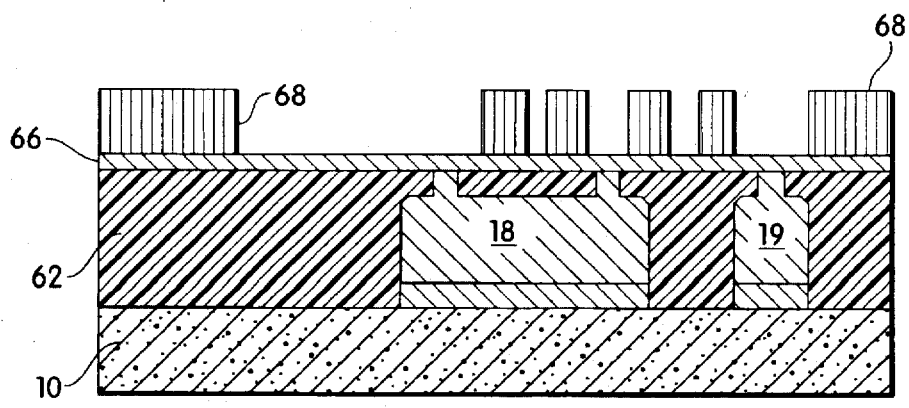
Figure 11:
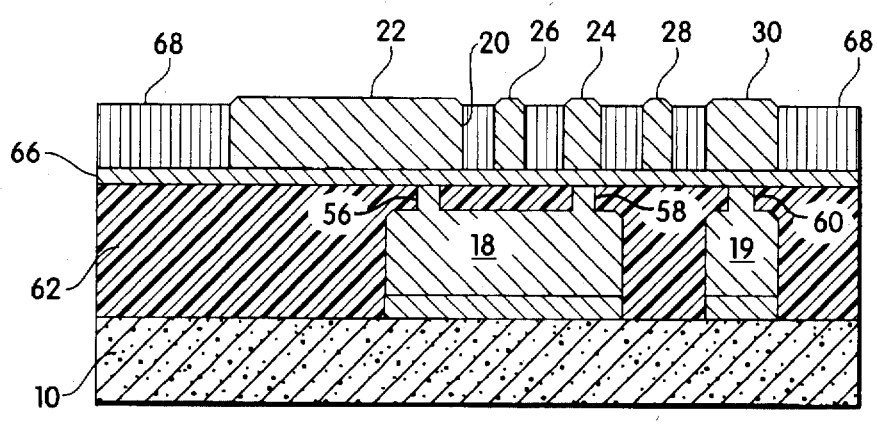
Figure 12:
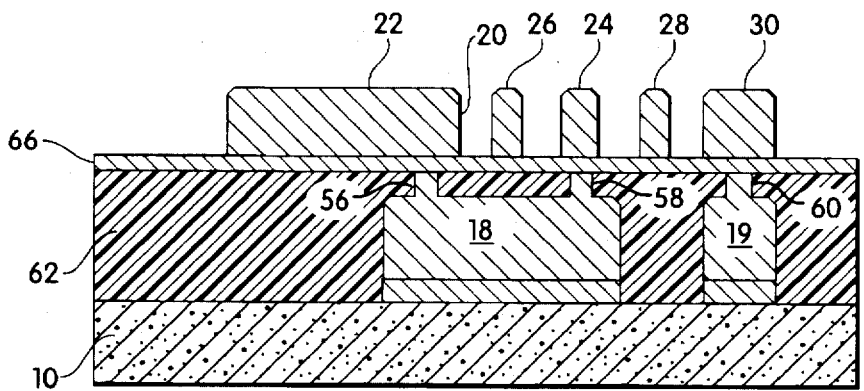
Figure 13:
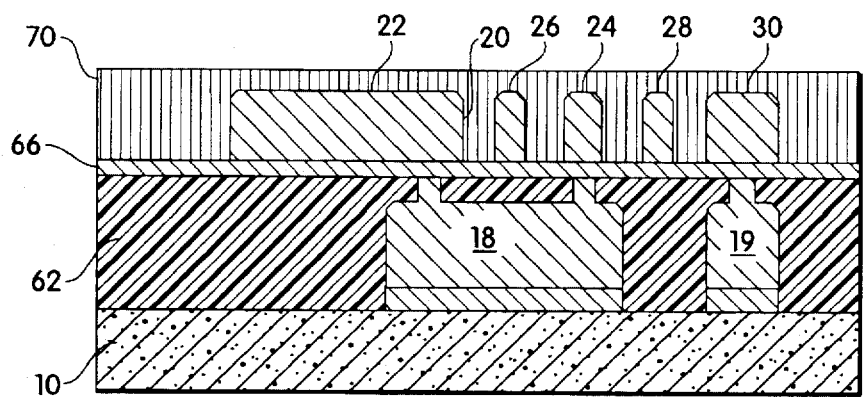
Figure 14:
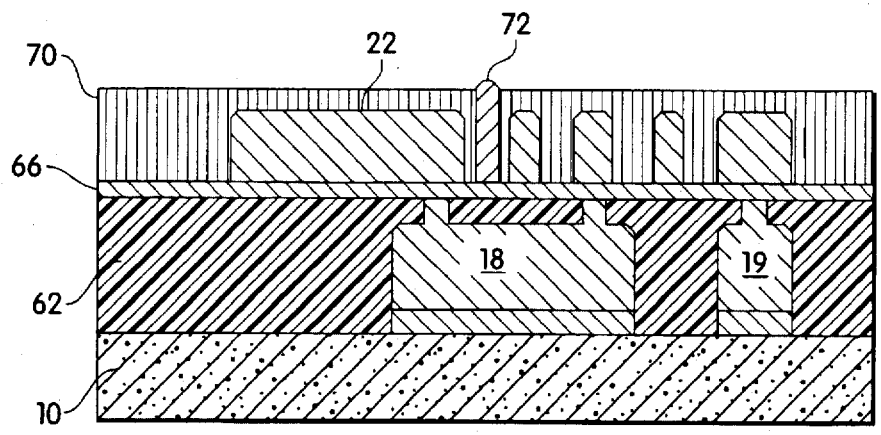

The assembly shown in FIG. 6 is next planarized. Specifically, a layer 62 of epoxy is deposited on the assembly, as show in FIG. 7. Suitable epoxy materials and other suitable materials are commercially available and will be apparent to those skilled in the art. Principally, the material must be sufficiently stable to further processing steps, as described below. Layer 62 can be deposited, for example, by spin-casting or other suitable method. After layer 62 is cured, its top surface 64 is ground or micromilled, preferably by diamond tool turning, sufficiently to expose the metal of the vias 56, 58, and 60 (and, of course, the other vias formed for the many other micro-coils of this and other micro-motors being fabricated on the wafer), as shown in FIG. 8. A second electroplating strike 66 is applied to the planarized surface 64, making electrical contact with the vias. Electroplating strike 66 preferably is a metal film stack deposited as described above. The resulting assembly (or "sub-assembly") is shown in FIG. 9. A third layer 68 of photo-responsive patterning material is deposited and patterned on electroplating strike 66 for forming the micro-coils, power buses, and ground bus structures. Layer 68, being preferably about 20 microns thick, in accordance with the preferred thickness for the aforesaid stator component structures, is shown post-patterning in FIG. 10. The stator components preferably are formed by electroplating copper, substantially as discussed above. The resulting assembly is shown in FIG. 11, comprising bifilar micro-coil 22, including its first terminus 20 in vertical registration with via 56 establishing electrical contact with jumper 18. Radially outward (i.e., to the right in FIG. 11) from micro-coil 22 are power buses 26, 24, and 28, in that order, with via 58 forming electrical contact between the outer radial end of jumper 18 and power bus 24. Radially outward of power bus 28 is ground bus 30, which is in electrical contact with jumper 18A by means of via 60 extending upwardly from the radial outer end 19 of jumper 18A to ground bus 30.

Where detente teeth are to be incorporated into the micro-motor structure, such as for a stepper motor design, a magnetic material is now deposited to form stator teeth for applying a detente force on the rotor. First, patterning material layer 68 is removed, leaving the assembly show in FIG. 12. A fourth layer 70 is then applied, preferably by a casting or doctor-blade technique. The stator structure is formed above layer 70, including the micro-coils and buses. Spin-casting is not preferred, since the large stator components typically would result in significant non-uniformities in the depth of layer 70. Layer 70 is then patterned in the usual manner, followed by deposition of a magnetic material to produce the assembly shown in FIG. 14. Stator teeth assembly 72 preferably is formed by electroplating a magnetic material such as Ni—Fe (80% Ni, 20% Fe), which serves as a suitable low-permeability magnetic material. The stator tooth assembly 72 can be electroplated to copper strike 66 in the usual manner. Stripping patterning layer 70 and removing the areas of electroplating strike 66 which are thereby exposed yields the assembly shown in FIG. 15. Electroplating strike 66 is removed to electrically isolate the stator components and electrical lines at this depth.

Figure 15:
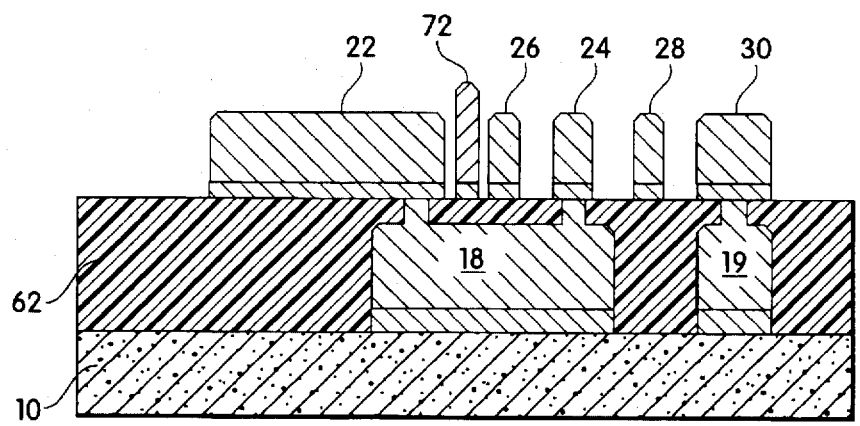

The assembly of FIG. 15 is planarized, preferably again by encapsulating or potting the assembly in an additional depth of epoxy 73 over epoxy layer 62, followed by micro-milling its upper surface 74 to remove irregularities from electroplating and epoxy casting irregularities. Smooth surface 74 will serve as a bearing surface for the rotor in the final configuration. The resulting assembly is shown in FIG. 16.

In accordance with a significant feature of the microfabrication method disclosed herein, release layers are used to enable continued fabrication of the micro-motor in self-assembled form. Due to the small size of the micro-motor components, it would be costly and impractical to separately produce the micro-motor components and then mechanically assemble them together. Through the use of release layers, fabrication of the micro-motor will now continue, using the same MEMS-type techniques to build up the rotor and housing components in-place over the stator/substrate assembly shown in FIG. 16. Most notably, release layers are used here to produce a rotor which will be permanently captured, yet rotatable, within a rotor chamber formed in the course of the microfabrication of the micro-motor.

Figure 16:
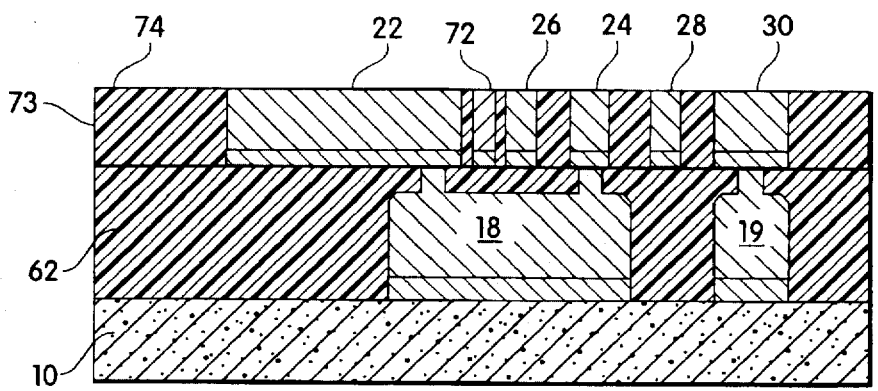
Figure 17:
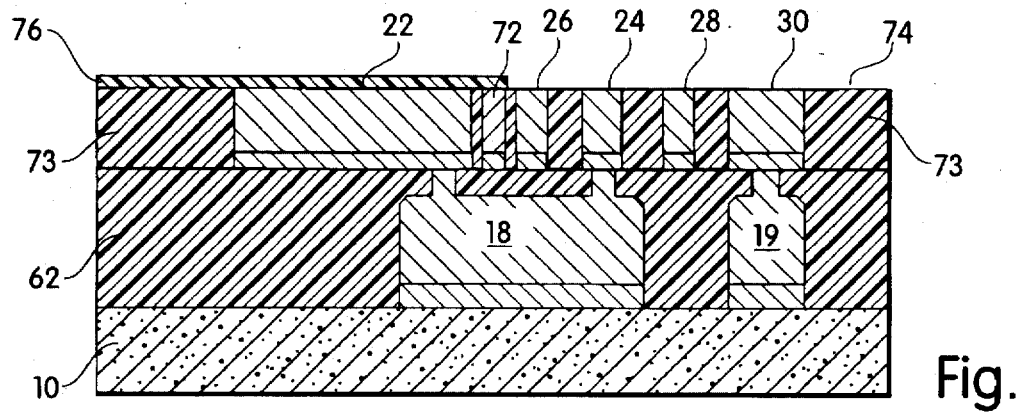

More specifically, referring to the assembly shown in FIG. 17, a release layer 76 is deposited on the upper surface 74 of the assembly shown in FIG. 16 and then patterned to cover an area corresponding to the bottom surface of the rotor chamber in the final assembly. In the embodiment of FIG. 17, the patterned release layer 76 can be seen to cover the stator components, namely micro-coil 22 and stator teeth assembly 72. For simplicity, reference numeral 73 will be used to refer to the unified epoxy layers 73 and 62 in FIGS. 17–35. The release layer preferably comprises poly-alpha-methylstyrene, deposited in benzene solution. It can be spin-cast onto surface 74. The solvent is then removed, such as by baking. To pattern release layer 76, suitable photo-responsive patterning material is coated onto the assembly. The resist is patterned and developed in the ordinary manner and those areas of the release layer unprotected by the patterned resist layer can then be removed in benzene or other suitable solvent. The resist layer is then removed, also in the ordinary manner. Poly-alpha-methylstyrene is preferred in view of its processing characteristics: it vaporizes when heated under vacuum to a temperature of 180° C. Other suitable release materials are commercially available and known to those skilled in this technology. Preferred alternative release materials include polymers with low glass temperature. The release material should be removed using a dry removal process to avoid liquid capillary forces that could seize the components of the micro-motor. Alternative suitable dry removal techniques include, for example, ion etching and plasma ashing in a partial oxygen atmosphere.

Figure 18:
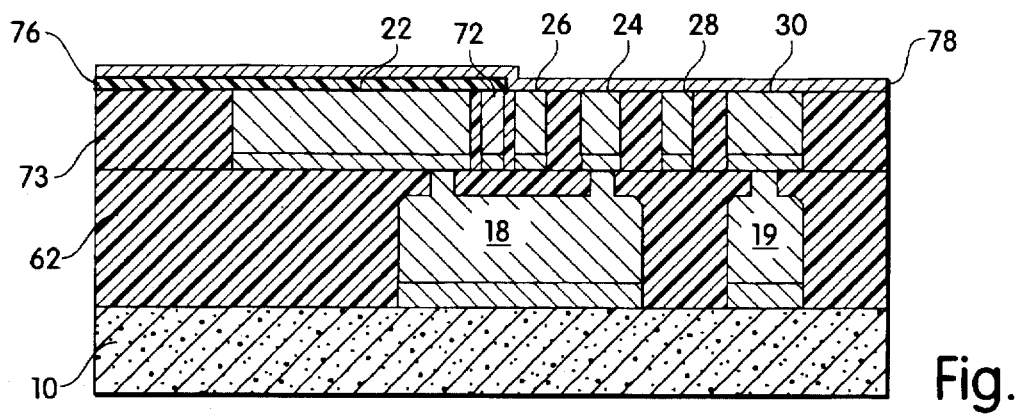
Figure 19:
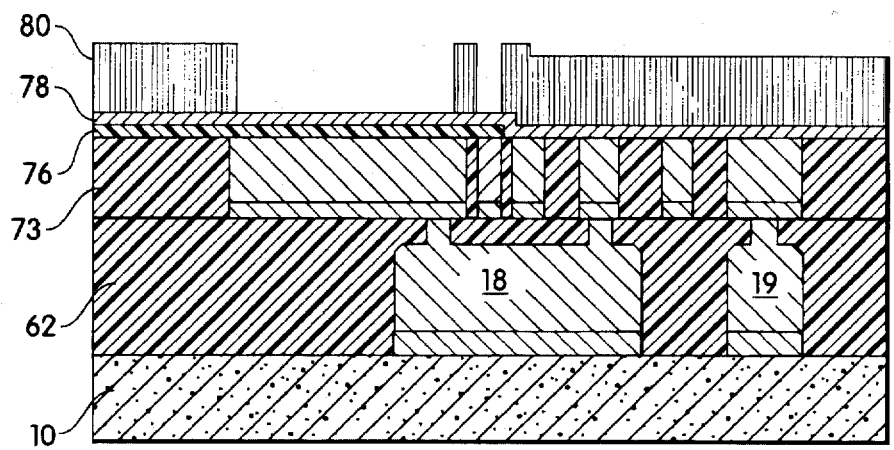

A first step in the formation of the rotor and housing structures is the depositing of an electroplating strike 78 onto the upper surface of the assembly of FIG. 17. Electroplating strike 78 may comprise, for example, a 100 nm-thick film stack of titanium over nickel. The resulting assembly is shown in FIG. 18. A thick resist layer 80 is then deposited and patterned over the electroplating strike 78 for forming the magnetic regions or poles and rotor teeth structure of the rotor. The patterning material for layer 80 preferably is about 20 microns thick, corresponding to the intended height of the aforesaid rotor components, and can be deposited by spin-casting. The assembly, after patterning of layer 80, is shown in FIG. 19.

The magnetic components of the rotor preferably are formed by electroless plating of a permanent magnetic material, preferably material of high coercivity, most preferably above 1500 Oersted with a magnetocrystalline anisotropy resulting in a permanent magnetic moment perpendicular to the plane of the rotor body when magnetized. This direction of the magnetic moment will give the greatest torques when electrical current is applied to the micro-coils. The coercivity of the material should be high to yield a large permanent magnetization in the material after it is magnetized by the usual external means, typically exposure to a strong magnetic field. Preferably CoNiReMn—P alloy or like magnetic material suitable for electroless plating is employed. This preferred material, a complex alloy of Co, Re, Ni, Mn, and P, forms the rotor poles and rotor detente teeth structure by electroless deposition as a result of autocatalytic reaction on the strike material when the wafer is submerged in the electroless plating solution. See Osaka-T. et al., *JPN.J.APPL.PHYS.*, 26, 1674 (1987).

While, in principle, electroless plating can result in films of any desired thickness, the magnetic poles and detente teeth structure of the rotors formed in accordance with this invention preferably are from 20 to 40 microns thick (thickness being the vertical direction as seen in FIGS. 1–35). The thicker magnetic bodies can provide greater responsiveness to a given electromotive field, but dimensional accuracy and releasability of the rotor may become more difficult to achieve. Alternative magnetic materials and forming techniques will be apparent to those skilled in the art and view of this discussion. Sputtered Cr—Co films have demonstrated perpendicular anisotropy, but generally have film thicknesses less than one micron, significantly limiting their usefulness.

Figure 20:
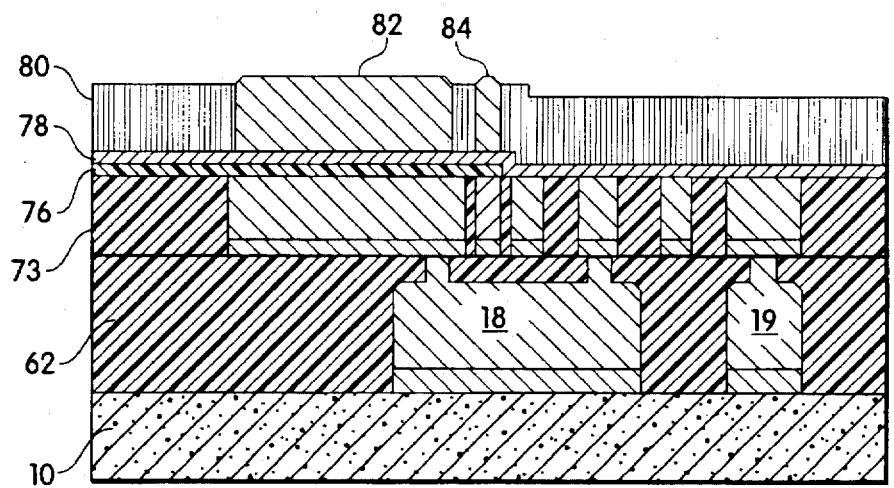
Figure 21:
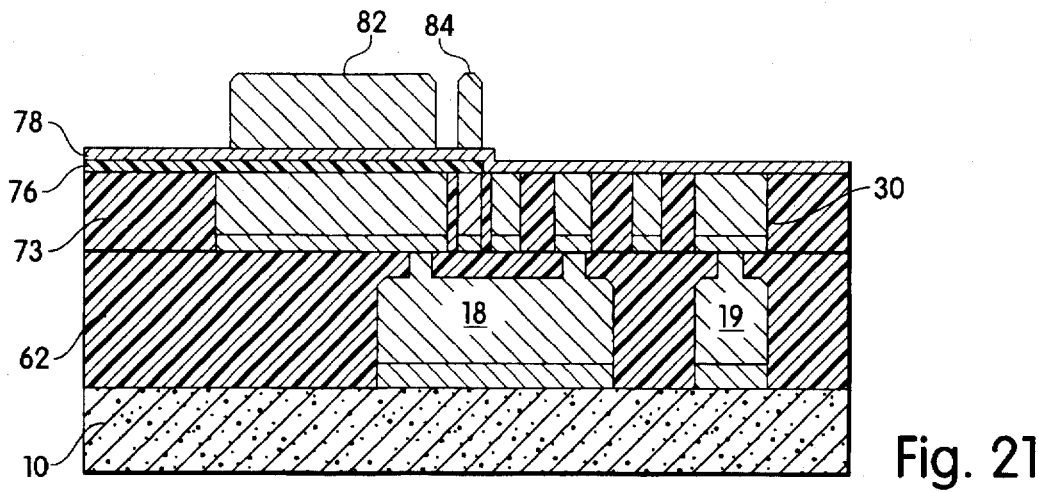
Figure 22:
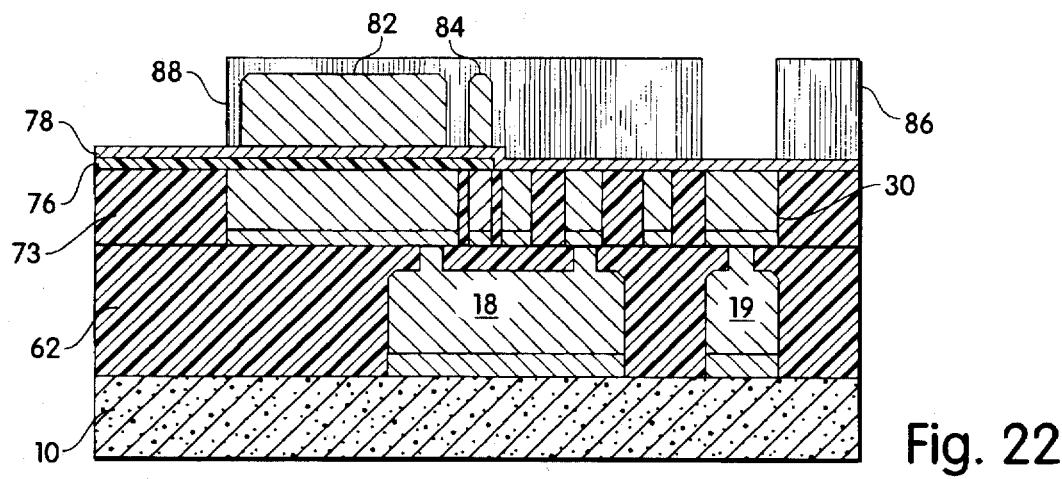

As seen in FIG. 20, magnetic pole 82 and rotor detente teeth structure 84 are formed in layer 80. Layer 80 is then removed, yielding the assembly shown in FIG. 21, following which a thick layer 86 of resist is deposited and patterned onto the assembly of FIG. 21 for forming a lower portion of the rotor shaft and ground bus contact. It should be recognized that electrical contact is required also for power buses 24, 26, and 28, for which purpose vertically extending contacts may also be formed at corresponding locations, in a manner substantially as illustrated for the ground bus 30. As seen in FIG. 22, layer 86 of photo-responsive patterning material has sufficient thickness to cover the magnetic material rotor structures. It should be recognized that opening 88 in this sixth layer of patterning material, as is true for all of the layers illustrated in FIGS. 1–35, is substantially symmetrical about a vertical line at its left edge, since for simplicity only the right-hand side of the micro-motor fabrication assembly is illustrated.

Figure 23:
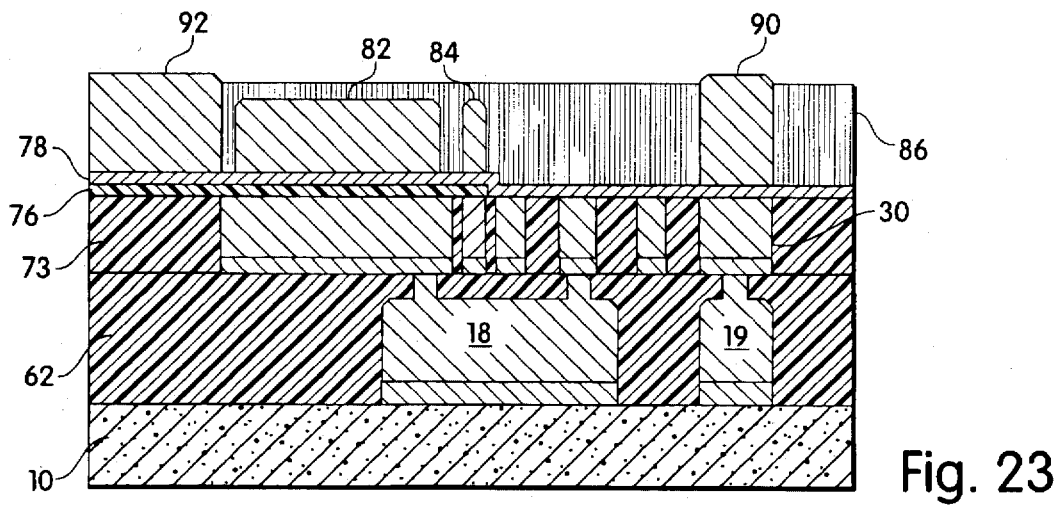

In FIG. 23 ground bus contact 90 and rotor shaft 92 have been formed, preferably of nickel, by electroplating. Advantageous simplicity is achieved by employing the same metal for both the rotor shaft 92 and the ground bus contact 90. Removal of the patterning material layer 86 and the portions of electroplating strike 78 thereby exposed yields the assembly shown in FIG. 24.

Figure 24:
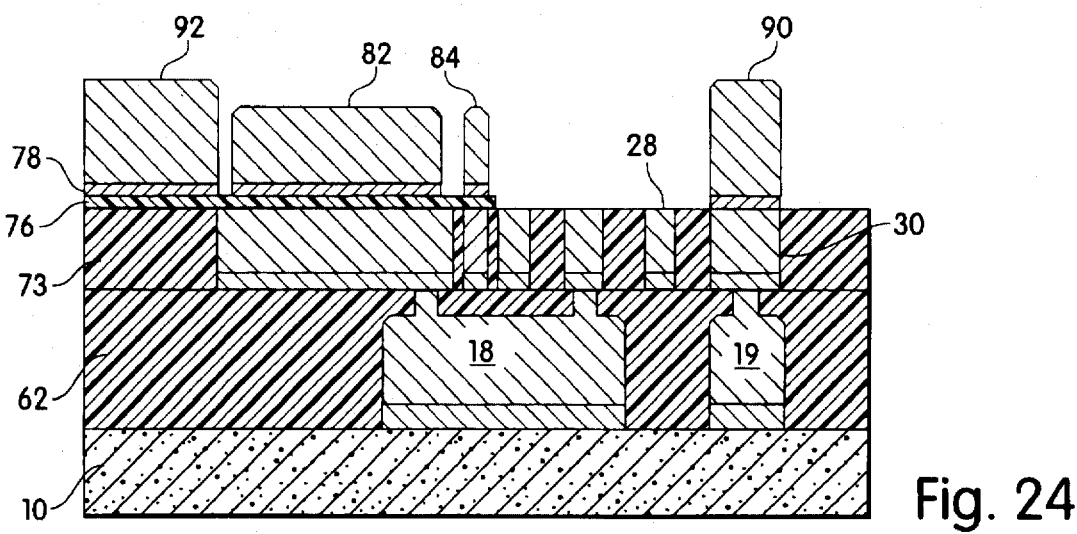
Figure 25:
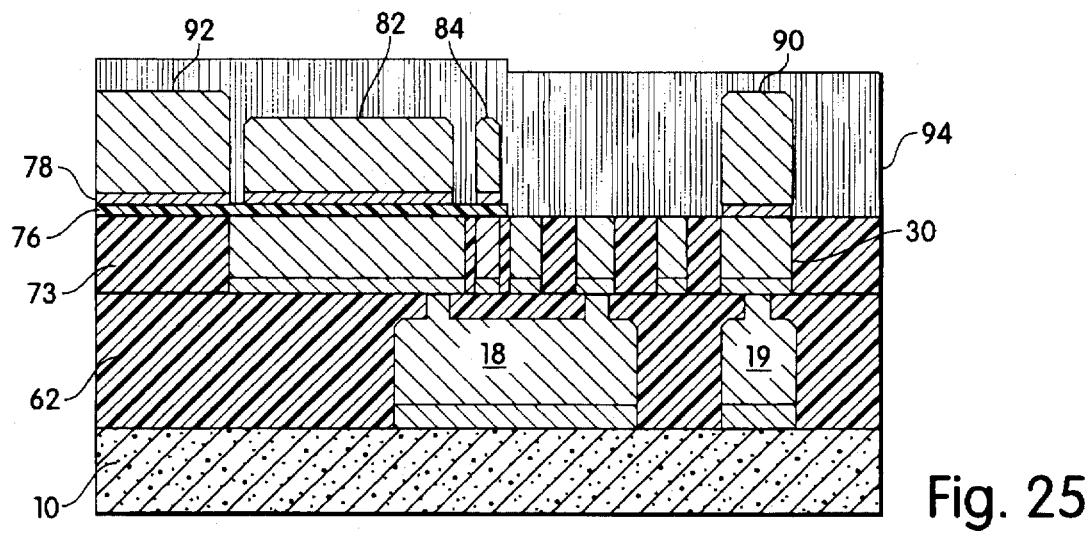
Figure 26:
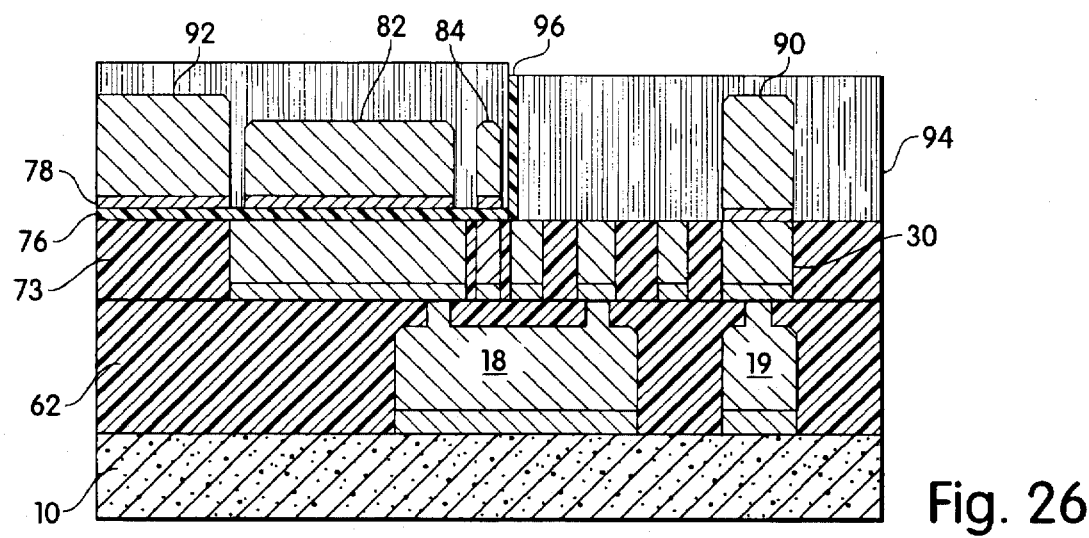

A seventh layer 94 of photo-responsive patterning material is deposited over the assembly of FIG. 24 in sufficient depth to cover the rotor components and bus contacts. In accordance with an advantageous aspect of the method herein described, portions of patterning material layer 94 will remain as part of the finished micro-motor assembly. Layer 94 can be blade cast to achieve a thick, relatively smooth layer. Layer 94 is patterned as seen in FIG. 26 to form a vertical release channel into which release material, as described above, is deposited. Vertical channel 96 is preferably about 2–5 microns wide and serves to define the radial outer surface of the rotor chamber in the finished assembly. Preferred release materials disclosed above can be deposited into release channel 96 by coating layer 94 onto the assembly under reduced atmospheric pressure, filling the channel with release material and then bringing the pressure up to atmospheric level. This is found to drive the liquid release material into the channel and reduces or eliminates trapped air bubbles. Vertical channel 96 extends upwardly from the radially outer perimeter of horizontal release layer 76. The upper surface 98 of the assembly illustrated in FIG. 26 is then micromilled sufficiently to expose the top surface of rotor shaft 92 and bus contact 90.

Figure 27:
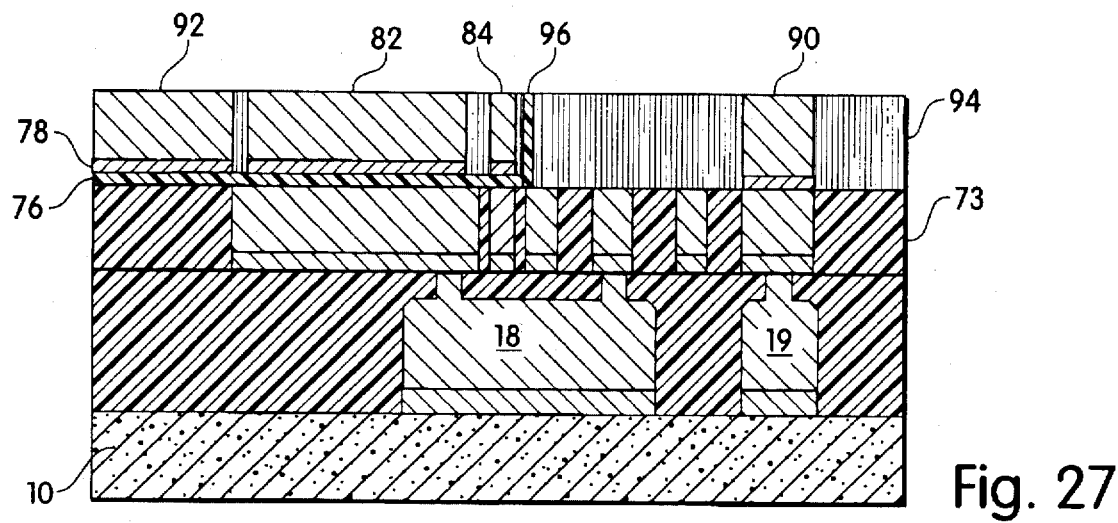
Figure 28:
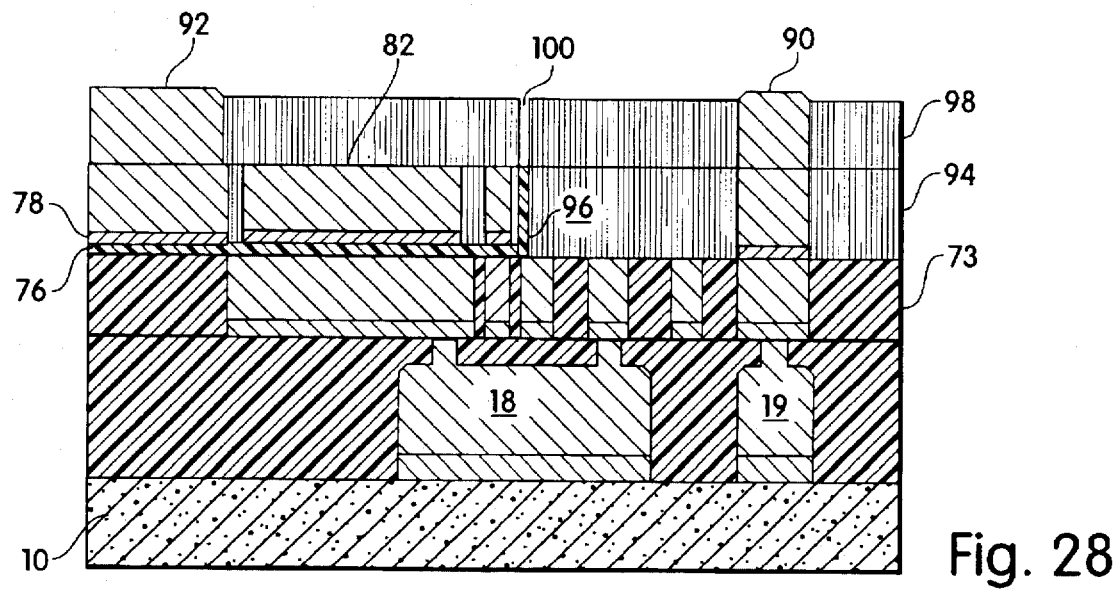
Figure 29:
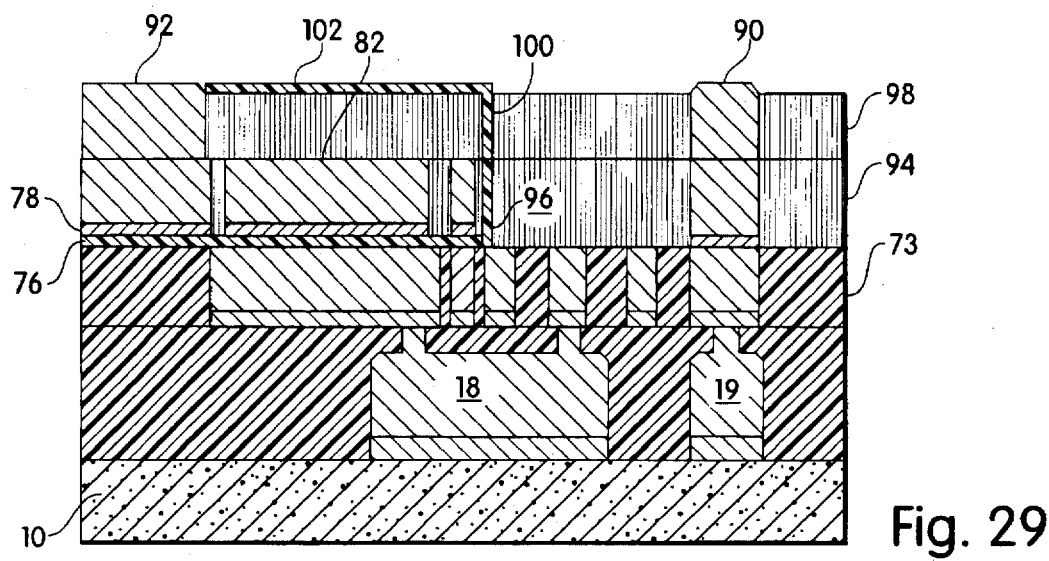

An eighth layer 98 of photo-responsive patterning material is deposited onto the assembly in FIG. 27 and patterned to further vertically extend the rotor shaft 92, vertical release channel 96, and bus contact 90. Since the electroplating strike 78 has been removed (other than from under existing rotor structures, etc.), the bus contact and rotor shaft preferably are extended upwardly by electroless plating. Electroless plating of nickel, for example, can be made to selectively deposit on the exposed upper surface of the previously electroplated rotor shaft and bus contact areas. The electroless plating does not affect opening 100 formed for an upward vertical extension of release channel 96. The resulting structure is shown in FIG. 28. Release material is then filled in the manner described above into vertical extension 100 of release channel 96 and over the upper surface of the assembly shown in FIG. 28. The upper horizontal layer of release material 102 is patterned, as shown in FIG. 29, corresponding to the upper surface of the rotor chamber in the final micro-motor assembly. It can be seen to extend between the vertical release channel 96/100 and the central rotor shaft 92. It should be noted that much of the eighth layer of patterning material, layer 98, will remain in the finished micro-motor assembly. In particular, portions of layer 98 radially inward of release channel 96/100 will remain in the micro-motor as part of the planar rotor body, while portions of layer 98 radially outward of the release channel will remain as portions of the housing of the micro-motor.

Figure 30:
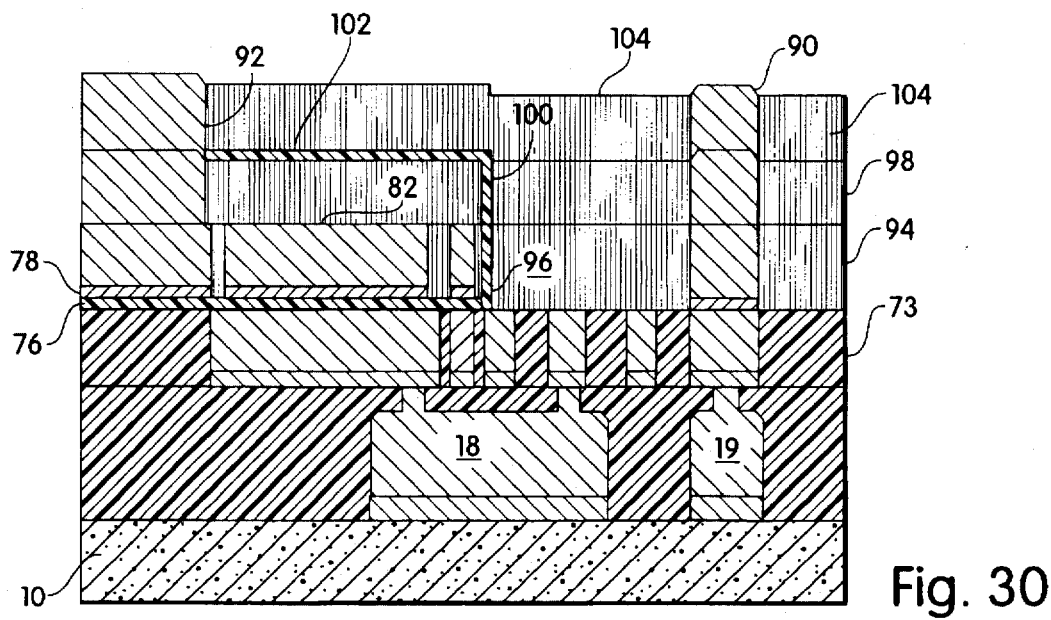

As seen in FIG. 30, a ninth layer of photo-responsive patterning material is deposited and patterned onto the assembly of FIG. 29 to further extend the rotor shaft 92 and bus contact 90. Layer 104 most preferably is a positive photoresist material to enable a first patterning to enable further vertical extension of the rotor shaft and bus contacts, again preferably by electroless deposition of nickel, followed by a second patterning to define a second vertical release channel as described immediately below. If a negative resist material were used, such as PSP, the material removed to define the second vertical release channel would already have been exposed and could not be further patterned. Thus, use of a positive photoresist for layer 104 constitutes a significant and advantageous aspect of the method here described.

The second vertical release channel mentioned above is shown in FIG. 31. Specifically, vertical release channel 106 is patterned in layer 104 and then filled with release material as described above. Since layer 104 will remain as part of the housing of the micro-motor, release layer 106 will permit rotation of the rotor shaft 92 in the final assembly. It should be noted that vertical channel 106 extends upwardly from the radially inner perimeter of the upper release layer 102.

Figure 31:
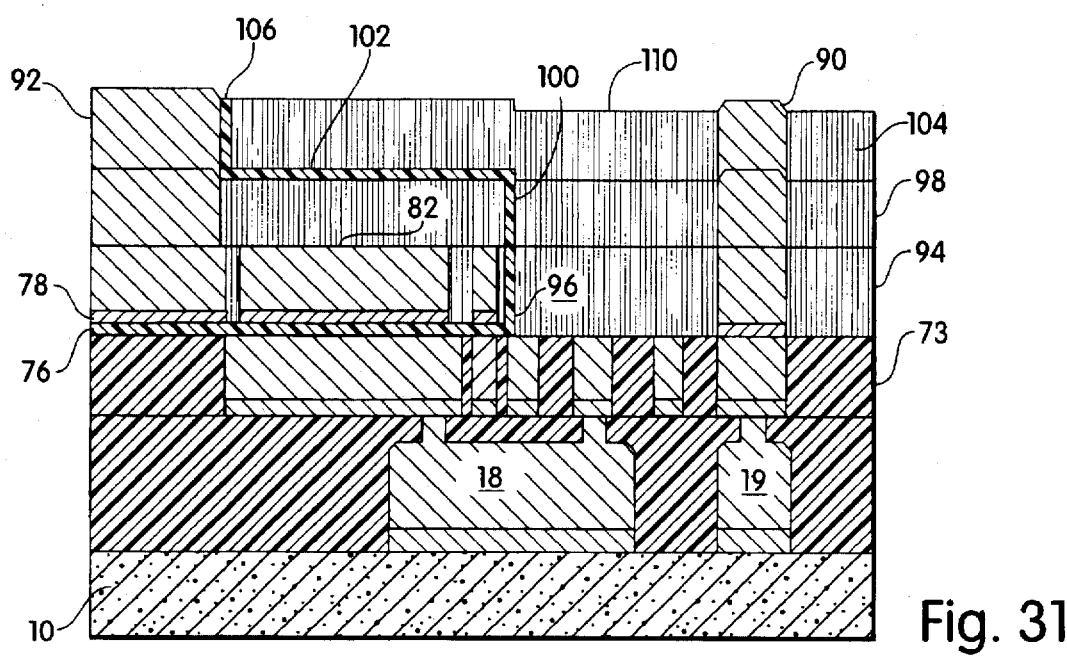
Figure 32:
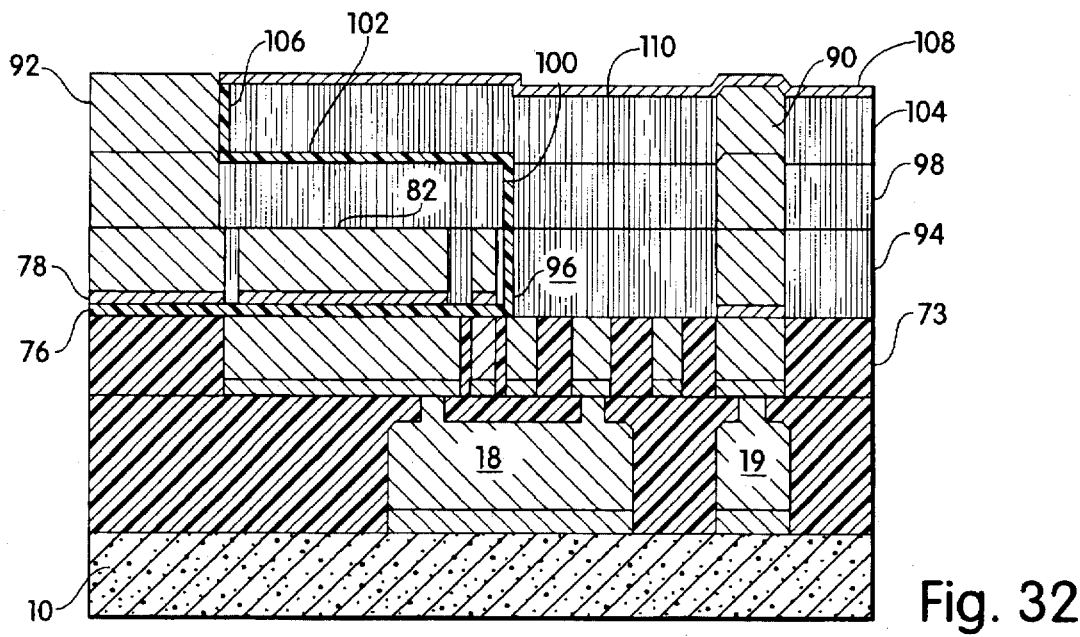

To facilitate further vertical extension of rotor shaft 92, a protective layer 108 is deposited over the rest of upper surface 110 of the assembly in FIG. 31. The resulting structure is shown in FIG. 32. The protective layer 108 can be formed, for example, by conventional evaporative or sputtering deposition of aluminum to a thickness of about 100 nm. Protective layer 108 will prevent exposure of underlying patterning material layer 104 to UV and other resist processing in the final steps.

Figure 33:
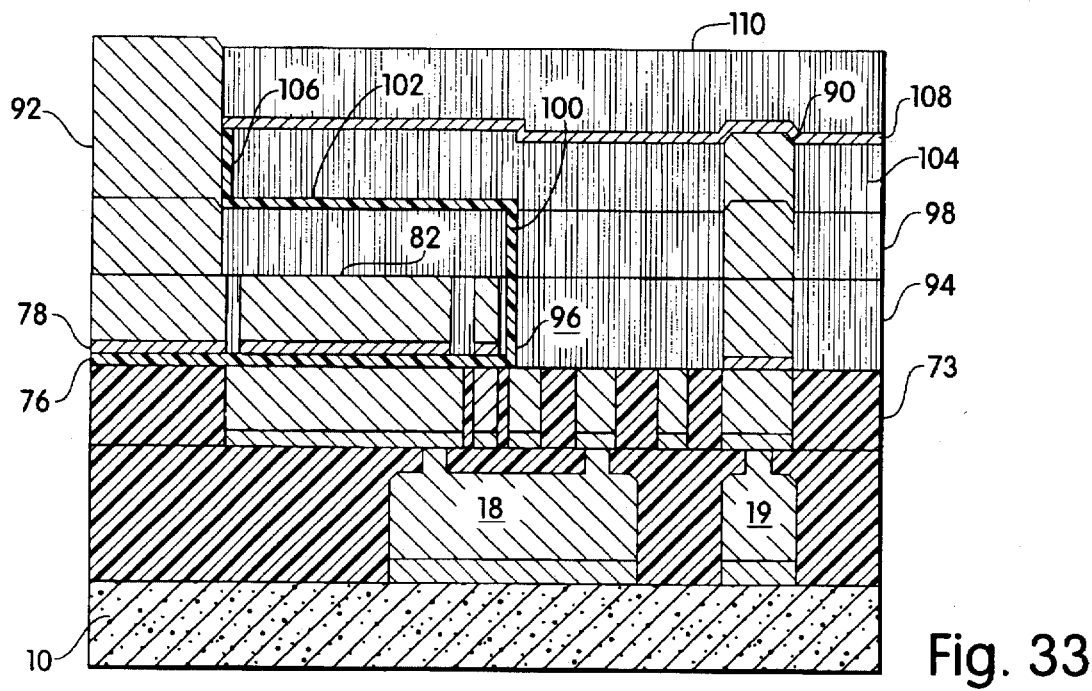

Onto the sub-assembly illustrated in FIG. 32, a thick tenth layer 110 of photo-responsive patterning material is deposited and patterned for further vertical extension of rotor shaft 92. Patterning layer 110 typically will be approximately 20 microns thick. The resulting structure, following electroless nickel deposition to extend rotor shaft 92, is shown in FIG. 33.

Figure 34:
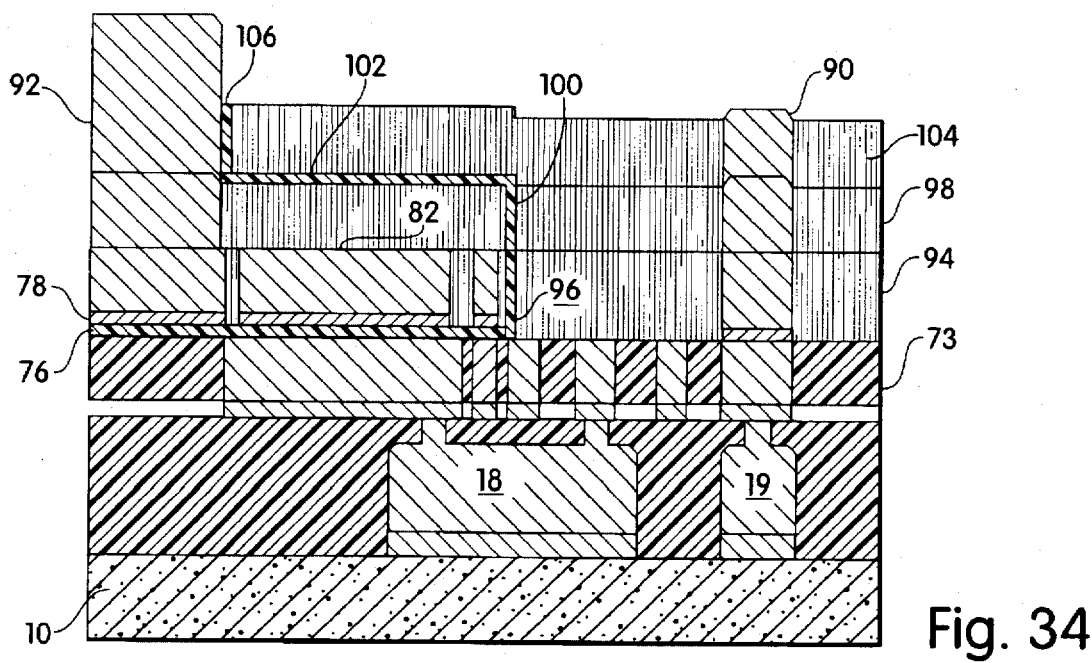
Figure 35:
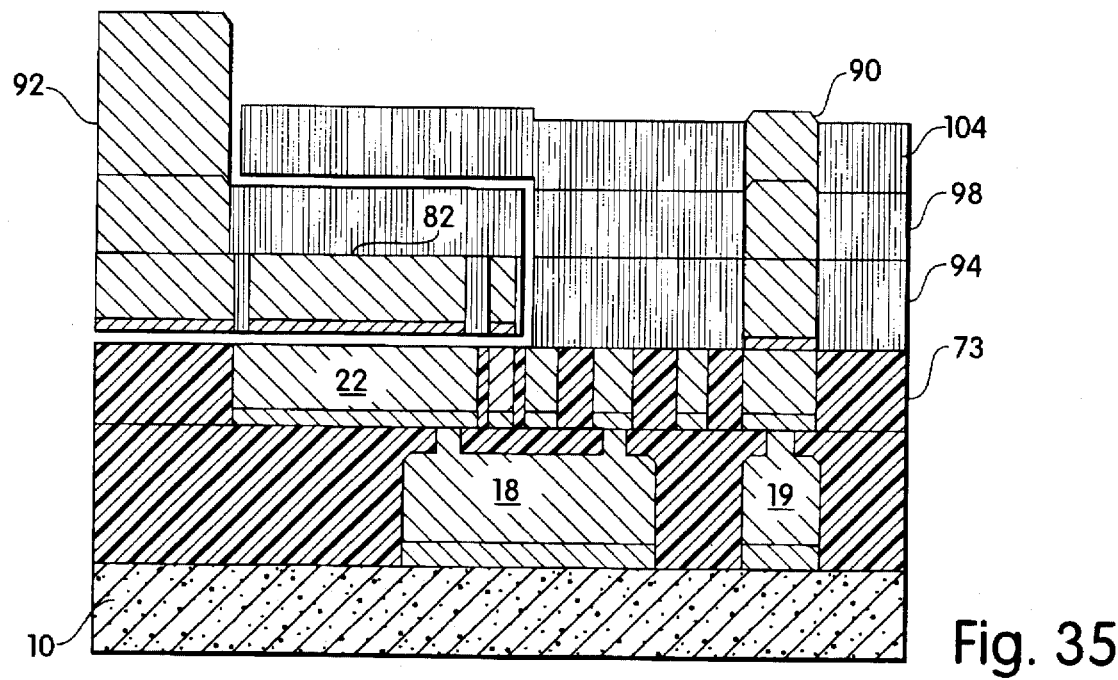

Patterning layer 110 and protective layer 108 are then removed by conventional techniques, yielding the assembly shown in FIG. 34. The basic micro-motor structure then is completed by removal of the release material. Specifically, the vertical release channels 106 and 100/96 are removed along with the horizontal upper release layer 102 and lower release layer 76, leaving the rotor freely rotatable within rotor chamber 112. As described above, a dry removal method is used in removing the release material, such as heating under vacuum in the case of the preferred release material poly-alpha-methylstyrene. The completed micro-motor assembly is shown in FIG. 35.

Figure 37:
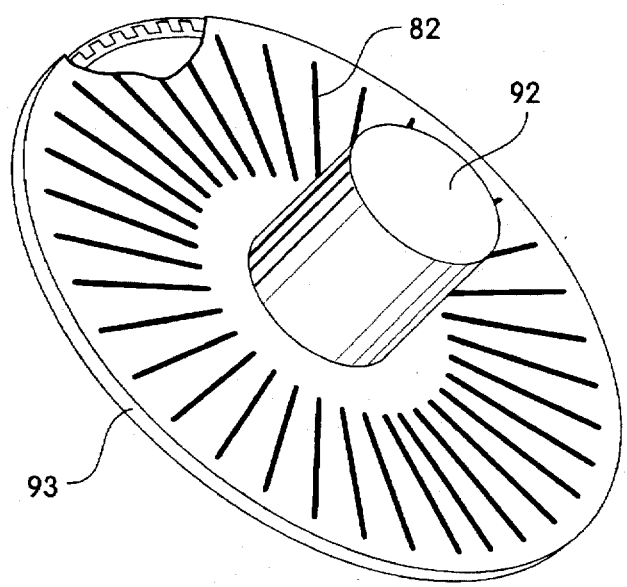
FIG. 37 is a perspective view, partially broken away, of the rotor of the micro-motor illustrated in FIGS. 1–35.
Figure 38:
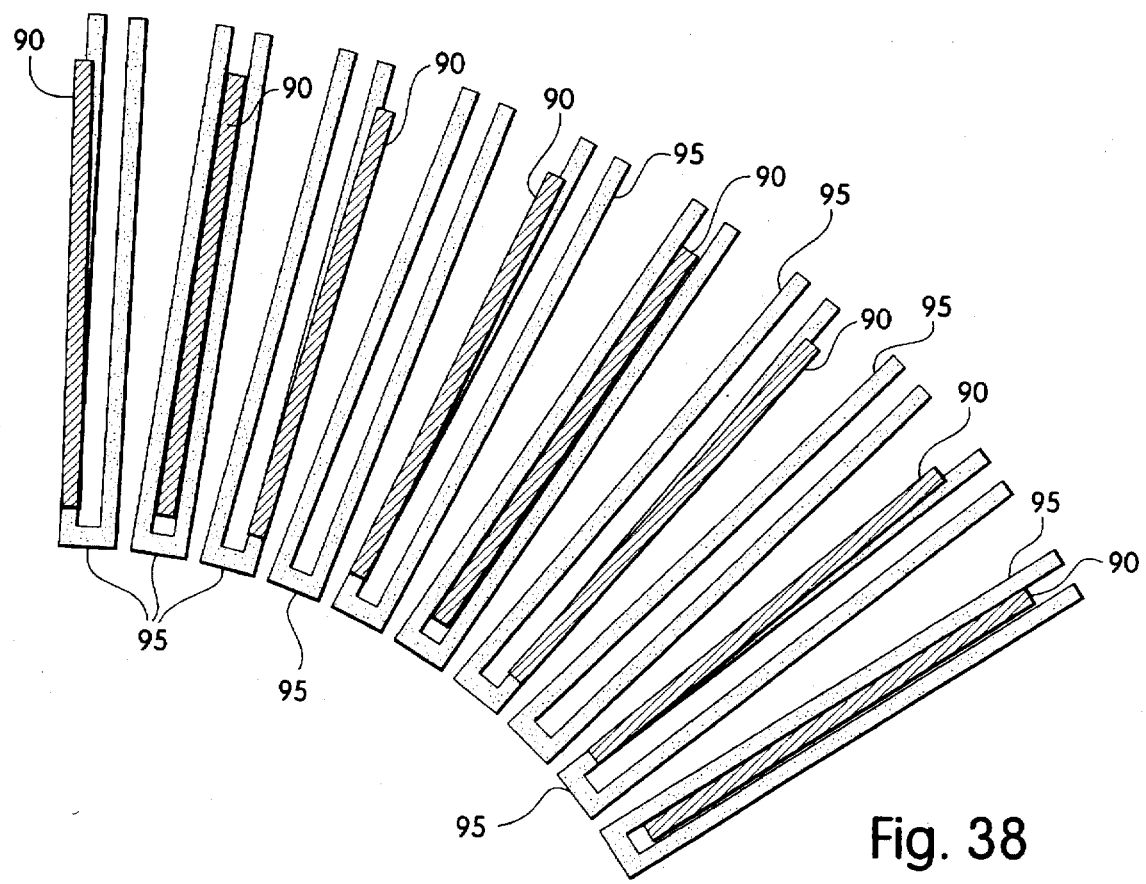
FIG. 38 is a schematic plan view illustrating the phase relationship of the three subsets of bifilar micro-coils to the magnetic rotor members in the three-phase stepper micro-motor illustrated in FIGS. 1–35.

A perspective view of the rotor is shown in FIG. 37, including rotor shaft 92 extending in the direction normal to the rotor body 93 wherein radially extending magnetic poles, including pole 82, are circumferentially spaced. Rotor detente teeth structure 84 is seen at the outer radial end of the magnetic poles. In FIG. 38 the phase relationship is shown between a representative group of the magnetic poles of the rotor, all given reference numeral 90, and the underlying bifilar micro-coils of the stator, all given reference number 95. The micro-motor of FIGS. 1–35 being a 3-phase design, the pole/rotor phase relationship is seen to have a repeating pattern for every three poles.

Those skilled in the art will recognize various modifications which can be made to the preferred and alternative embodiments of the fabrication method disclosed above. All such modifications within the true scope and spirit of the invention are intended to be included within the scope of the claims recited below.

We claim:

1. A method of fabricating a planar micro-motor comprising a planar stator supported by an electrically insulating substrate, a planar rotor body aligned over the stator, and a housing integral with the substrate and forming a rotor chamber therewith in which the rotor is rotatably captured, the method comprising, in combination, the steps of microfabricating the stator, rotor, and housing as an integral unit on the substrate with a layer of release material encapsulating the rotor body within the housing, and then removing the release material to free the rotor body for rotation within the rotor chamber.

2. The method of fabricating a planar micro-motor in accordance with claim one, wherein the release material is poly-alpha-methylstyrene and it is removed to free the rotor body by heating to at least 180° C. at below atmospheric pressure.

3. The method of fabricating a planar micro-motor in accordance with claim 1 further comprising, prior to removing the release material, forming a rotor shaft extending upwardly from the rotor body with additional release material separating the rotor shaft from the housing.

4. The method of fabricating a planar micro-motor in accordance with claim 1 wherein the rotor shaft is formed by electroplating a first portion proximate to the rotor body followed by electroless plating a second portion extending upwardly from the first portion.

5. The method of fabricating a planar micro-motor in accordance with claim 3 wherein the stator comprises bifilar micro-coils for receiving electrical current to generate electro-mechanical fields, the bifilar micro-coils extending radially in a first plane circumferentially spaced about a center point.

6. The method of fabricating a planar micro-motor in accordance with claim 5 wherein the planar rotor body comprises a plurality of magnetic regions circumferentially spaced about a rotor shaft and aligned over the bifilar micro-coils, said magnetic regions being formed by electroless deposition of permanent magnetic material of coercivity above 1,500 Oe, followed by exposure to an external magnetic field.

7. The method of fabricating a planar micro-motor in accordance with claim 1 wherein multiple layers of photo-responsive patterning material are used in microfabrication of the stator and rotor, portions of at least some of the layers of photo-responsive patterning material remaining in the micro-motor to at least partially form the housing.

8. The method of fabricating a planar micro-motor in accordance with claim 7 wherein portions of at least one of the layers of photo-responsive patterning material remains in the micro-motor as part of the rotor body.

9. A method of fabricating a planar micro-motor comprising:

a stator supported by an electrically insulating substrate comprising micro-coils arrayed in a first plane and circumferentially spaced about a center point, for receiving electrical current to selectively generate electromagnetic fields;

a rotor comprising a planar rotor body having a plurality of magnetic regions circumferentially spaced about a rotor shaft and aligned over the micro-coils in a second plane parallel with the first plane; and a housing comprising side and cover walls integral with the substrate to form a rotor chamber, the rotor body being captured in the rotor body between the stator below and the cover wall of the housing above, and being rotatable in the rotor chamber in response to electromagnetic fields generated across a planar gap between the rotor body and the micro-coils;

the fabrication method comprising in combination, the following steps in the order recited:

microfabricating the stator on an electrically conductive upper surface of the insulating substrate;

forming a planar lower release layer over at least the micro-coils of the stator;

microfabricating the rotor body above the stator, thereby sandwiching the lower release layer between them, the side wall of the housing, a perimeter release channel radially outward of the rotor body as an upward extension of the lower release layer, and a planar upper release layer over the rotor body as an extension of the perimeter release channel;

forming the cover wall of the housing over the upper release layer, thereby sandwiching the upper release layer between the cover wall and the rotor body; and forming the rotor chamber by removing the upper release layer, the peripheral release channel, and the lower release layer to free the rotor body for rotation.

10. A batch method of microfabricating from a single wafer of smooth, electrically insulating substrate material a plurality of planar stepper micro-motors, each stepper micro-motor comprising:

a substrate formed of a portion of the wafer; stator means for receiving three-phase electrical power to selectively generate electromagnetic fields, comprising (a) circumferentially spaced bifilar micro-coils supported by the substrate and arrayed radially in a first plane about a center point and (b) stator teeth arrayed in a circle in said first plane radially outward of the bifilar micro-coils;

rotor means for rotation in a second plane substantially parallel to the first plane in response to said electromagnetic fields, comprising circumferentially spaced, elongate magnetic pole members arrayed radially in a planar rotor body about a rotor shaft having a longitudinal axis of rotation substantially normal to the rotor body and passing through said center point in the first plane, and rotor detente teeth arrayed in the rotor body in a circle in said second plane radially outward of the pole members in registry with the stator teeth;

housing means comprising a sidewall supported on the stator means and surrounding the rotor body and a cover wall integral therewith extending over the rotor body in a third plane substantially parallel with the first and second planes, the housing and stator means together forming a rotor chamber in which the rotor body is rotatably captured; and energizing means for selectively passing electrical power to the bifilar micro-coils to generate electromagnetic fields, comprising concentric power buses substantially in the plane of the bifilar micro-coils, at least one of the buses corresponding to each of the three current phases, and each of the power buses comprising arcuate segments extending from one bifilar micro-coil to the next micro-coil of the same current phase;

the microfabrication method comprising depositing a first electroplating strike on an upper surface of the wafer and then, substantially simultaneously for each micro-motor being formed on the wafer, performing in combination, in the following order, the steps of:

depositing and patterning a first layer of photo-responsive patterning material for forming electrical jumpers extending radially between the bifilar micro-coils and corresponding ones of the power buses;

electroplating the electrical jumpers into the first layer of photo-responsive patterning material;

depositing and patterning a second layer of photo-responsive patterning material for forming electrically conductive lower vias extending upwardly from the jumpers;

electroplating the lower vias into the second layer of photo-responsive patterning material;

removing the first and second layers of photo-responsive patterning material and exposed areas of the first electroplating strike;

depositing a first epoxy layer on the upper surface of the substrate in sufficient depth to cover the vias, and then micromilling to planarize its upper surface and expose the vias;

depositing a second electroplating strike on the upper surface of the first epoxy layer in electrical contact with the exposed vias;

depositing and patterning a third layer of photo-responsive patterning material on the second electroplating strike for forming the bifilar micro-coils and power buses in registry with the vias;

removing the third layer of photo-responsive patterning material;

depositing and patterning a fourth layer of photo-responsive patterning material in sufficient depth to cover the micro-coils and power buses, for forming the stator teeth;

electroplating the stator teeth of magnetic material into the fourth layer of photo-responsive patterning material;

removing the fourth layer of photo-responsive patterning material and exposed areas of the second electroplating strike;

forming a stator sub-assembly by depositing a second epoxy layer and then micromilling to planarize its upper surface and expose the bifilar micro-coils, stator teeth, and power buses;

depositing a first release layer over a center portion of the upper surface of the stator sub-assembly corresponding to the lower surface of the rotor chamber, covering at least the bifilar micro-coils and stator teeth;

depositing a third electroplating strike over the release layer and exposed upper surface of the stator sub-assembly, in electrical contact with the power buses;

depositing and patterning a fifth layer of photo-responsive patterning material on the third electroplating strike for forming the rotor pole members and rotor detente teeth in registry with the bifilar micro-coils and stator teeth, respectively;

removing the fifth layer of photo-responsive patterning material;

depositing a sixth layer of photo-responsive patterning material to a depth sufficient to cover the rotor pole members and rotor detente teeth, and patterning the sixth layer of photo-responsive patterning material for forming lower portions of the rotor shaft and electrically conductive upper vias for the power buses;

electroplating into the sixth layer of photo-responsive patterning material the lower portions of the rotor shaft and upper vias; removing the sixth layer of photo-responsive patterning material and exposed areas of the third electroplating strike;

depositing a seventh layer of photo-responsive patterning material for forming a vertical first release channel extending upwardly from the first release layer at its outer perimeter, corresponding to a circumferential outer surface of the rotor chamber;

depositing release material into the first release channel and micromilling the seventh layer of photo-responsive patterning material to planarize its upper surface and expose upper surfaces of the lower portions of the rotor shaft and upper vias, a portion of the seventh layer of photo-responsive patterning material remaining in the plane of the rotor pole members both radially inward and radially outward of the release channel;

depositing and patterning an eighth layer of photo-responsive patterning material for upwardly extending the first release channel and upper portions of the rotor shaft and upper vias;

depositing by electroless plating into the eighth layer of photo-responsive patterning material to upwardly extend the upper portions of the rotor shaft and upper vias, and depositing release material (a) into the upward extension of the first release channel and (b) in a second release layer covering the upper surface of the eighth layer of photo-responsive patterning material between the first release channel and the rotor shaft, such second release layer corresponding to the upper surface of the rotor chamber;

depositing and patterning a ninth layer of photo-responsive patterning material consisting of positive photoresist material upwardly extending the upper portions of the rotor shaft and upper vias;

extending the upper portions of the rotor shaft and upper vias by electroless plating into the ninth layer of photo-responsive patterning material;

further patterning the ninth layer of photo-responsive patterning material for forming a second vertical release channel surrounding the extended upper portion of the rotor shaft, and depositing release material into the ninth layer of photo-responsive patterning material to form the second release channel;

depositing and patterning a temporary protective film over the ninth layer of photo-responsive patterning material to prevent its exposure to actinic radiation;

depositing and patterning a tenth layer of photo-responsive patterning material for upwardly extending the upper portion of the rotor shaft;

upwardly extending the upper portion of the rotor shaft by electroless plating;

removing at least portions of the eight, ninth and tenth layer of photo-responsive patterning material and the protective film, a portion of the eighth layer of photo-responsive patterning material remaining as part of the rotor body, and at least portions of the eighth and ninth layers of photo-responsive patterning material remaining in the plane of the rotor body and above it, respectively, as a portion of the micro-motor housing; and releasing the rotor for rotation within the rotor chamber in response to electromagnetic fields generated by the bifilar micro-coils by removing the release material from the first and second release layers and the first and second release channels.

11. The batch method of microfabricating planar stepper micro-motors in accordance with claim 10 wherein the insulating substrate material is polished and oxidized silicon.

12. The batch method of microfabricating planar stepper micro-motors in accordance with claim 10 wherein the first and second electroplating strike each is a film stack consisting essentially of a first metal film selected from chromium and titanium on the upper surface of the insulating substrate material, a second film of copper metal on the first film, and a third film of chromium metal on the second film.

13. The batch method of microfabricating planar stepper micro-motors in accordance with claim 10 wherein the bifilar micro-coils, jumpers, power buses, and lower vias are formed of copper metal.

14. The batch method of microfabricating planar stepper micro-motors in accordance with claim 10 wherein the lower portions of the rotor shaft and upper vias are formed of electroplated metal, and the upper portions thereof are formed by electroless metal plating.

* * * * *